United States Patent

Hamel et al.

[11] Patent Number: 5,943,148
[45] Date of Patent: Aug. 24, 1999

[54] SURVEILLANCE SYSTEM OF A MULTI-WAVELENGTH RING NETWORK

[75] Inventors: AndréHamel, Lannion; Valérie Tholey, Villeur Banne; Jean Stoschek, Pleumeur-Bodou, all of France

[73] Assignee: France Telecom, Paris, France

[21] Appl. No.: 08/802,483

[22] Filed: Feb. 20, 1997

[30] Foreign Application Priority Data

Feb. 23, 1996 [FR] France ............................. 96 02262

[51] Int. Cl.$^6$ ............................................ H04J 14/02
[52] U.S. Cl. ................. 359/124; 359/119; 359/124; 359/125; 359/110; 359/123
[58] Field of Search ........................... 359/124, 123, 359/125, 119, 110

[56] References Cited

U.S. PATENT DOCUMENTS

| | | |
|---|---|---|
| 5,150,243 | 9/1992 | Suzuki . |
| 5,265,096 | 11/1993 | Parruck . |
| 5,513,029 | 4/1996 | Roberts . |
| 5,548,431 | 8/1996 | Shine et al. ............................. 359/119 |
| 5,760,934 | 6/1998 | Sutter et al. ............................. 359/119 |
| 5,796,501 | 8/1998 | Sotom et al. ............................. 359/119 |

FOREIGN PATENT DOCUMENTS

| | | |
|---|---|---|
| 234730 | 9/1987 | European Pat. Off. . |
| 3525105 | 1/1987 | Germany . |

OTHER PUBLICATIONS

Ant Nachrichtentechnische Berichte, Dec. 1986, pp. 95–112, Host Kleinmann E.A., "Optische Betriebsysteme fur den Weitverkehr".

U.S. Ser. No. 08/643549, filed May 8, 1996, "Ring Network for Transmitting Wavelength–Multiplexed Information", Alain Sutter et al.

*Primary Examiner*—Jason Chan
*Assistant Examiner*—Mohammad Sedighian
*Attorney, Agent, or Firm*—Pearne, Gordon, McCoy & Granger LLP

[57] ABSTRACT

This network, intended for the transmission of information in optical form, wavelength multiplexed, comprises nodes (N1, N2) linked to each other by at least one optical fiber (F1), at least one wavelength being treated in each node. The system comprises unit (OF1, OF2, OS1, OS2) for superimposing on the information, for at least one wavelength per node, a surveillance signal whose frequency is outside the transmission band and, in each node, a surveillance circuit (CS1, CS2) for sampling at least one part of the surveillance signals, elaborating surveillance information in function of this part and sending this information to the processing units of the network. Application in optical telecommunications.

9 Claims, 6 Drawing Sheets

SURVEILLANCE SYSTEM OF A MULTI-WAVELENGTH RING NETWORK

DESCRIPTION

1. Technical Field

This invention concerns a surveillance system of a multi-wavelength ring network.

It notably applies to the sphere of optical fiber telecommunications and in particular to telecommunications using the Synchronous Digital Hierarchy transmission standard, also referred to as the SDH transmission standard.

2. State of the Prior Art

Present-day information transmission networks using the Synchronous Digital Hierarchy transmission standard transmit information in ring or linked architectures, and a part of transmission capacity is reserved for the processing of the transmitted data.

Certain features of Synchronous Digital Hierarchy are summarized below.

Synchronous Digital Hierarchy designates the successive multiplexing steps permitting the simultaneous transmission of different speeds and kinds of signals.

The signals carried in a synchronous transmission network, that is to say a network using the SDH standard, are first of all "enveloped" in a container.

This container is a sub-assembly of the frame which is reserved for and allocated to the transmission of a given speed.

In SDH, part of the information is reserved for the processing of the transmitted data.

These items of processing information, known as overheads, are associated with either the frame or the container.

In this case, the containers are referred to as virtual containers.

These virtual containers are processed in the SDH transmission network independently of the signal they carry.

The SDH networks are synchronized but the signals arriving in the node of such a network may have undergone phase variations resulting from fluctuations of propagation time in the network, or from frequency variations in the event of defective synchronization or plesiochronous functioning.

This difficulty is overcome by using a pointer which indicates the relative position of a signal in the synchronous frame and thus makes it possible to identify the phase of the different signals without having to resort to the phase alignment of the frames of these signals.

The useful information may thus "float" in the area reserved for it in the frame, its position being located by the pointer.

FIG. 1 represents in diagram form the STM-1 basic frame (Synchronous Transport Module-1).

In this figure, AU represents the Administrative Unit and PT the corresponding pointer.

The STM-1 basic frame is structured in 9 rows of 270 bytes and is characterized by a length of 2430 bytes, a duration of 125 $\mu$sec and a speed of 155,520 Mbit/sec.

It has a payload of 2349 bytes (150,336 Mbits/sec) and a speed reserved for processing of 81 bytes.

The normalized high-speed multiplexes are STM-1 (155, 520 Mbits/sec), STM-4 (622,080 Mbits/sec) and STM-16 (2488,320 Mbits/sec).

Various overheads are reserved in the frame for operation and maintenance, namely:

RSOH (Regeneration Section Overhead), for the processing of the regeneration sections at each repeater-regenerator, MSOH (Multiplexing Section Overhead), for the processing of the multiplexing sections at the line terminals, POH (Path Overhead), for the processing of the virtual containers order 4, and POH of the lower order VCs (Virtual Containers), that is to say the path overhead for the processing of the lower order virtual containers.

The signification of the RSOH bytes is given below:

A1, A2: The configuration A1A1A1A2A2A2 constitutes the frame locking word (A1=11110110 A2=00101000).

C1: AUG indicator. This is a number attributed to an AUG (Administrative Unit Group) before being multiplexed at STM-N.

B1: Byte reserved for the surveillance of errors on the bits of the regenerated elementary section (between two regenerators), using a bit interleaved parity 8 code (BIP-8), even parity.

E1 and F1: These two bytes supply a service channel and a user channel, only in the AUG No. 1 of an STM-N.

D1 to D3: These three bytes are assigned to communicating data from the DCC (Data Communication Channel) at 192 kbit/sec (extension of the processing network).

The signification of the MSOH bytes is given below:

B2: Three bytes reserved for the surveillance of errors on the bits of the multiplexing section, using a bit interleaved parity 24 code (BIP-24), even parity, calculated on all the bytes of the preceding frame except those of the RSOH.

K1, K2: These two bytes are assigned to the command of APS (Automatic Protection Switching) 1+1 or 1:N. Only bytes K1 and K2 of AUG No. 1 of an STM-N are exploited. K2 is an FERF command (Far End Remote Failure), for example SIA, Mq Sig.

D4 to D12: These nine bytes form a DCC, at 576 kbit/sec, for a multiplexing section (extension of the processing network).

Z1 and Z2: Reserve bytes.

E2: Service channels at 4 kbit/sec on a multiplexing section.

Table I below represents the overhead byte table in an STM-1 frame.

TABLE I

| A1 | A1 | A1 | A2 | A2 | A2 | C1 | | |
|----|----|----|----|----|----|----|----|----|
| B1 |    | E1 |    |    | F1 |    |    |    |
| D1 |    | D2 |    |    | C3 |    |    |    |
|    |    |    | Pointer |    |    |    |    |    |
| B2 | B2 | B2 | K1 |    |    | K2 |    |    |
| D4 |    | D5 |    |    |    | D6 |    |    |
| D7 |    | D8 |    |    |    | D9 |    |    |
| D10 |   | D11 |   |    |    | D12 |   |    |
| Z1 | Z1 | Z1 | Z2 | Z2 | Z2 | E2 | NU | NU |

After this brief recapitulation, we shall now return to current ring networks.

FIG. 2 provides an example in diagram form of a standard ring network.

This is a bi-directional network, comprising two optical fibers marked 2 and 4 along which information in optical form travels in opposite directions.

A single wavelength is transmitted in each fiber.

The network shown in FIG. 2 comprises 4 nodes 6, 8, 10, 12 and a central station 14.

Each node comprises an ADM (Add-Drop Multiplexer).

These ADMs communicate respectively with local user zones 16, 18, 20, 22, for example at a speed of 2 Mbits/sec.

Thus, in the network shown in FIG. 2, optical fibers are used as transmission support between two successive nodes.

There is an optical/electrical transposition at the arrival of each node and an electrical/optical transposition at the departure of each node.

The processing and alarm signals are elaborated in the ADMs and thus in the electrical domain (for example state of alarms, calculation of transmission errors) and are added to the useful information according to the specifications defined in the corresponding standard and the whole is then transmitted by optical fiber to the next node.

The exploitation of the overhead provides a global visibility of the ring.

The faults (for example cutoff of the fiber or the connector) and the quality of the transmission are analyzed on each section, between two ADMs.

At the present time, the possibility of simultaneously transmitting several wavelengths on a same fiber is not exploited in ring networks.

The first considered applications of multi-wavelength transmission concern high-speed and long-distance point-to-point links.

The solutions advanced are rooted in the simultaneous propagation of several wavelengths on an optical fiber with optical line amplifiers in line so as to procure a wide range.

A solution advanced for transmitting surveillance information is the use of a wavelength dedicated to processing which is derivated at each node and detected in order to monitor the parameters of the optical amplifiers installed in line.

Multi-wavelength optical amplification systems for point-to-point links are for example proposed by the Pirelli company under reference T31.

With regard to the ring architectures currently under consideration, the transmission capacity is distributed over the different nodes.

In order to increase this transmission capacity when the ring reaches saturation point, it is necessary to change the installations of all the nodes in order to move to a higher level of transmission in the numerical hierarchy, for example in order to move from STM-1 to STM-4 or from STM-4 to STM-16.

Studies currently being conducted in several telecommunications laboratories propose the introduction of wavelength multiplexing on ring architectures.

In this connection, the following document may be consulted:

A. Hamel et al., Multilayer add-drop multiplexers in a self-healing WDW ring network, OFC '95 Technical Digest.

The solution which is usually proposed consists in assigning one wavelength per link between two nodes in order to ensure the exchange of the corresponding information on a physical ring support.

This solution is made possible by introducing an optical layer allowing the exchange of information by spectral routing.

This is illustrated in FIG. 3 which shows in diagram form a multi-colored SDH ring.

This ring comprises four nodes 24, 26, 28, 30 and a network head 32, which are linked by two optical fibers 34 and 36 (bi-directional ring).

Information in optical form travels along these optical fibers in opposite directions.

The network head 32 contains means 35 of transmitting information intended for the different nodes, and means 38 and 40 of receiving information coming from these nodes.

These means 38 and 40 correspond respectively to the fibers 34 and 36.

In the ring network shown in FIG. 3, four wavelengths $\lambda 1$, $\lambda 2$, $\lambda 3$ and $\lambda 4$ are used, which are respectively associated with the nodes 24, 26, 28 and 30.

Each node comprises an optical component known as an OADM (Optical Add-Drop Multiplexer).

The OADMs associated with the nodes 24, 26, 28 and 30 are marked respectively 24a, 26a, 28a, 30a.

FIG. 4 illustrates in diagram form the operating principle of a simple OADM example.

The OADM in FIG. 4 receives signals of various wavelengths at its output 42, makes it possible, for example, to extract a wavelength signal $\lambda$ from these signals and supplies this wavelength signal $\lambda$ at its extraction output 44.

Moreover, this OADM makes it possible to insert, among the non-extracted signals, a wavelength $\lambda$ signal arriving at its insertion input 46 and supplies, at its output 48, this signal and the non-extracted signals.

It may be seen from FIG. 3 that the OADMs of the nodes 24, 26, 28 and 30 communicate respectively with installations 50, 52, 54 and 56 which are for example of the ADM-type of FIG. 2.

These installations 50, 52, 54 and 56 in turn communicate respectively with local user areas 58, 60, 62 and 64.

Each of the OADMs may be fixed or tunable (for example control voltage or electrical frequency) and several optical technologies may be used, for example multi-dielectric optical fibers or diffraction gratings or photo-inscribed Bragg gratings.

As we have seen from the example shown in FIG. 3, a wavelength is allocated to each node.

The corresponding OADM is designed to derivate this wavelength.

The other wavelengths remain in the fibers.

Thus, the information exchanged between the network head and the node 30, by the fiber 34, travels under the wavelength $\lambda 4$ and crosses four optical fiber sections without optical/electrical transposition, and therefore without there being any information as to the quality of the transmission on each section, and without there being any possibility of locating a transmission fault linked to a wavelength, like for example a shift in wavelength or damaged performance of an optical fiber of an OADM.

DISCLOSURE OF THE INVENTION

This invention aims to remedy the disadvantages mentioned above by providing a visibility of the optical layer (the whole consisting of fibers and OADMs) which is as fine (section by section) and precise (wavelength by wavelength) as on a standard SDH transmission ring (of the kind shown in FIG. 2) in order to locate faults, elaborate alarms (at the level of the installations) and to ensure transmission of these alarms to the ring processing means which are situated in the network head (but which are not shown in FIG. 3).

More generally, this invention resolves the problem of surveillance of a multi-wavelength ring network and of the transmission of information concerning this surveillance to the network processing means.

Specifically, this invention concerns a surveillance system of a multi-wavelength ring network, this network being intended for the transmission, according to a given standard, of information in optical form, wavelength multiplexed, this information occupying, when converted into electrical form, a frequency band known as transmission band, this network comprising:

nodes optically linked to each other by at least one first optical fiber which passes successively by these nodes and along which the information is intended to travel in a first direction, ADMs (Add-Drop Multiplexers), respectively placed in the nodes of the network and capable of sending information to the other nodes, OADMs (Optical Add-Drop Multiplexers), respectively associated with the AMDs, each OADM being capable of inserting, in the first fiber, information coming from the associated ADM and of extracting from this first fiber information for this associated ADM, and network processing means, at least one wavelength being treated in each node, this surveillance system being characterized in that it comprises:

means of superimposing on the information, for at least one wavelength per node, an optical surveillance signal whose frequency, when this signal is converted into electrical form, is outside the transmission band, in each node, a surveillance circuit for sampling at least one part of the surveillance signals reaching this node, elaborating surveillance information in function of this sampled part and sending this surveillance information to the first optical fiber via the ADM and the OADM of this node, this surveillance information reaching in this way the processing means According to a preferred embodiment of the system concerned by the invention, the information is transmitted according to the Synchronous Digital Hierarchy transmission standard.

According to a first particular embodiment of the system concerned by the invention, the surveillance information is sent to the processing means after being introduced in the overhead of the information to be transmitted in optical form.

According to a second particular embodiment, each ADM comprises a means of light emission which is optically coupled to the corresponding OADM and which is controlled by electrical signals corresponding to the information to be transmitted optically and by an electrical signal whose frequency is situated outside the transmission band, this electrical signal being modulated by electrical signals corresponding to the surveillance information.

According to a particular embodiment of the invention, the network comprises a second optical fiber passing successively by the nodes of the network and along which information is intended to travel in a second direction opposite to the first direction, each OADM being capable of inserting information coming from the associated ADM in the second fiber, and of extracting from this second fiber information intended for the associated ADM and the surveillance information sent in this first fiber is also sent in the second fiber and vice versa.

Each node may be associated with a wavelength, or the network may be a colored node network, each node then being capable of treating a plurality of wavelengths, or again the network may be a colored section network, each node then being capable of treating two wavelengths.

The frequency of each optical surveillance signal, converted into electrical form, is preferentially below the transmission band.

BRIEF DESCRIPTION OF THE DRAWINGS

A clearer understanding of this invention will emerge from the following description of embodiment examples, given purely for illustrative and non limitative purposes, with reference to the accompanying drawings in which.

DETAILED DISCLOSURE OF PARTICULAR EMBODIMENTS

Figure 1:
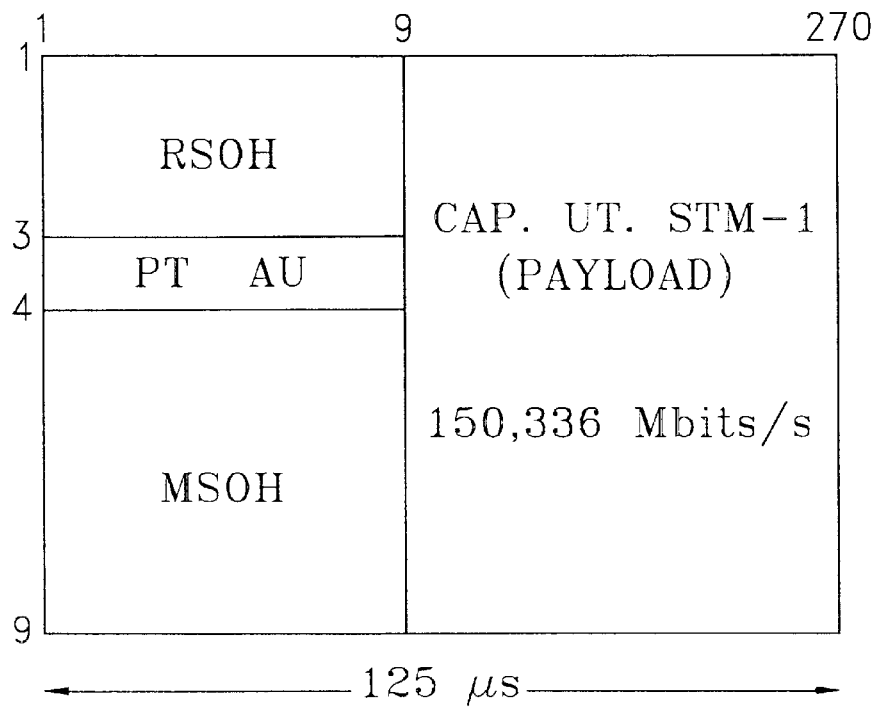
FIG. 1, previously described, illustrates in diagram form the STM-1 basic frame, FIG. 2, previously described, is a diagram view of a known ring network, FIG. 3, previously described, is a diagram view of a known multi-colored ring network, FIG. 4, previously described, is a diagram view of an OADM example.

In a ring network for which surveillance is desired in conformity with the invention, there is no electronic equipment on the optical fiber or fibers of this network (totally optical layer).

However, since there is always one wavelength which is treated in each node of the network, in conformity with the invention an electrical frequency is superimposed on each wavelength, outside the transmission band.

More specifically, when the information which it is wished to transmit optically in the network is converted into electrical signals, these signals occupy a frequency band called "transmission band", ranging for example from 20 kHz to 150 MHz.

Frequencies which are situated outside this transmission band are associated with the optical wavelengths treated in the network.

Frequencies situated above the transmission band may be chosen but it is preferable to choose frequencies below this transmission band.

For example, given a wavelength $\lambda$ treated in a node of the network, a frequency f of 3.5 kHz is associated with this wavelength and the sinusoidal electrical signal having this frequency f is superimposed on the electrical signals to be transmitted in the network and is converted optically with them for the purposes of this transmission.

It should be noted that the frequency f may be modulated.

The superimposition referred to above makes it possible to create a superimposed transmission channel, at low speed, which acts as tracer for the associated wavelength and the wide band signal transmitted.

Any damage to the network in the course of transmission will result in similar damage to the wide band signal and the tracer.

This tracer is receive and analyzed at each node of the network and the information elaborated from this tracer is then routed in the transmission channel which is associated to the signal to be injected in each node.

At each node, a surveillance circuit treats the information elaborated from the tracers which are sampled.

The number of tracers treated depends on the quantity of information to be elaborated.

Two techniques may be used for routing this information to the processing means of the ring network.

A first technique consists in using the low-speed transmission channel which is associated, by overmodulation, to the wide band signal injected in the ring network.

A second technique, which may be used when the information is transmitted according to the SDH transmission standard, consists in using the overhead of the wide band signal injected in the ring, such as for example a service communication channel F1 or E1, E2.

This second technique is particularly suited to high-speed STM-16, small-sized ring networks in which optical amplification is little used.

With regard to the network head (forming the principal node of the network), in which the processing means of the network are situated, the correlation of the messages which are elaborated at each node and transmitted in the ring permit supervision of each section of the optical layer.

Figure 5:
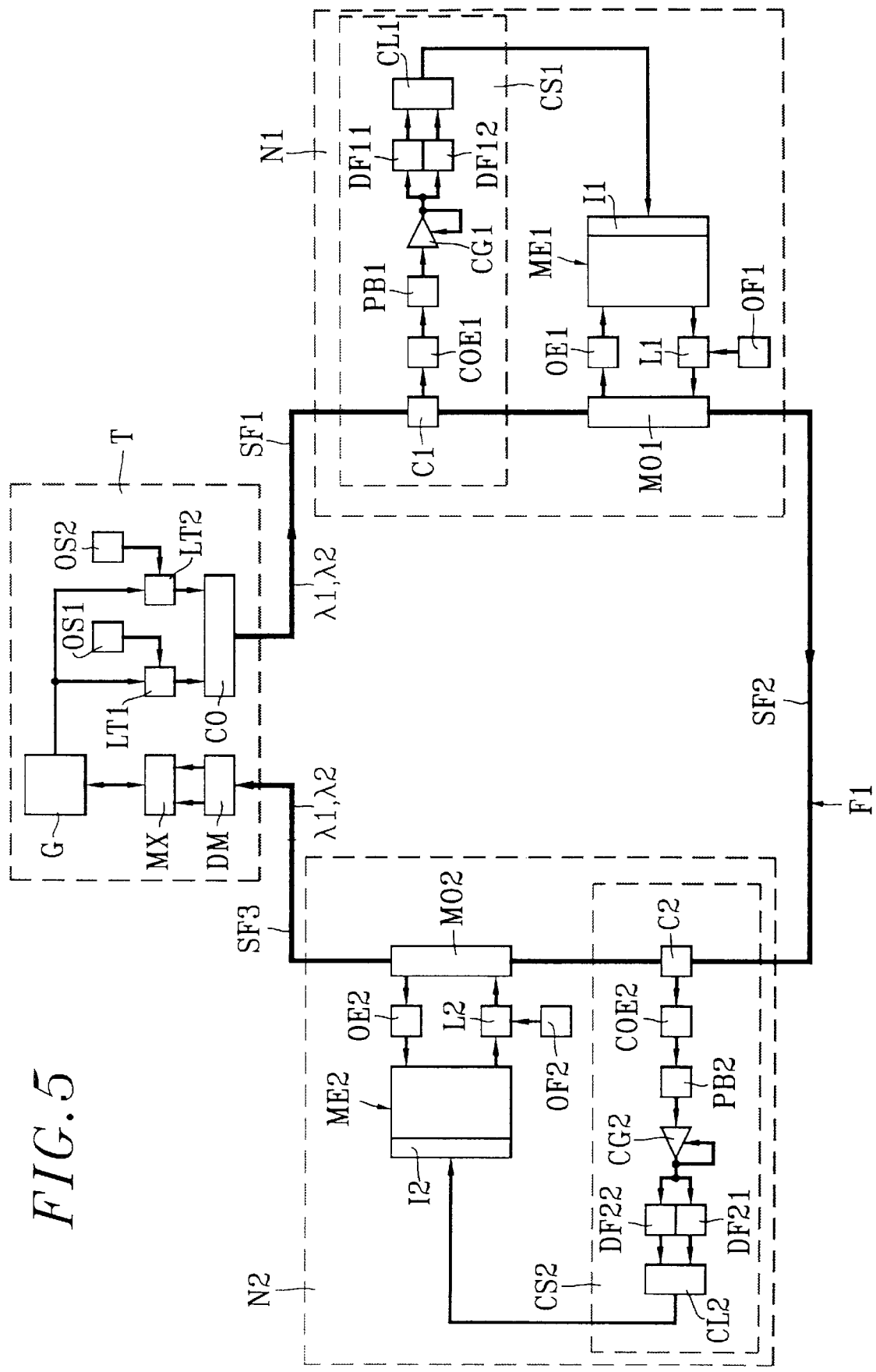
FIG. 5 is a diagram view of a first particular embodiment of the surveillance system concerned by the invention, applied to the surveillance of a two-node unidirectional ring network.

FIG. 5 is a diagram view of a particular embodiment of the surveillance system concerned by the invention.

The system shown in FIG. 5 is designed for the surveillance of a multi-wavelength ring network.

This network is designed for the transmission, according to the SDH standard, of information in optical form which is wavelength multiplexed.

This network comprises:
two nodes N1 and N2 and a network head T,
an optical fiber F1 which passes successively by the nodes N1 and N2 and by the network head T, which optically links these said nodes and along which information is designed to travel in a given direction (the network is unidirectional),
two ADMs marked ME1 and ME2 and situated respectively in the nodes N1 and N2,
two OADMs marked MO1 and MO2 and associated respectively to the multiplexers ME1 and ME2, and
processing means G of the network, which are situated in the network head T.

Three sections may be distinguished in the network shown in FIG. 5, namely the fiber section SF1 which stretches from the head T to the node N1, the fiber section SF2 which stretches from the node N1 to the node N2 and the fiber section SF3 which stretches from the node N2 to the head T.

In the network shown in FIG. 5, an optical wavelength $\lambda 1$, for example equal to 1549 nm, is assigned to the node N1 and an optical wavelength $\lambda 2$, for example equal to 1541 nm, is assigned to the node N2.

The processing means G and the multiplexers ME1 and ME2 exchange information with each other.

Each of the multiplexers MO1 and MO2 is designed to insert the information from the associated ADM in the fiber F1 and to extract from this fiber F1 the information intended for this associated ADM.

Each multiplexer ME1 or ME2 is equipped with an opto-electrical converter OE1 or OE2 for converting in electrical form the information at the wavelength $\lambda 1$ or $\lambda 2$ extracted by the associated multiplexer MO1 or MO2.

Each multiplexer ME1 or ME2 is also equipped with a laser L1 or L2 for converting in optical form, at the wavelength $\lambda 1$ or $\lambda 2$, the information coming from this multiplexer ME1 or ME2 and which is to be inserted, thanks to the associated multiplexer MO1 or MO2, among the non-extracted information.

In addition to the processing means G, the network head T comprises two lasers LT1 and LT2 which emit respectively at the wavelengths $\lambda 1$ and $\lambda 2$ and which are controlled by the processing means G.

Each of these lasers LT1 and LT2 receives information (STM-1) in electrical form from the means G and converts this information into optical form.

This information is sent to the fiber F1 through the intermediary of an optical coupler CO linked, on one side, to the outputs of the lasers LT1 and LT2 and, on the other side, to an extremity of the fiber F1.

The network head T also comprises a means of optical demultiplexing DM (for example a diffraction grating demultiplexer) which is connected, on one side, to the other extremity of the fiber F1 in order to receive the signals of the wavelengths $\lambda 1$ and $\lambda 2$ and, on the other side, to a means of electrical multiplexing MX.

This means of multiplexing MX is equipped, at its input, with means (not shown in the figure) of opto-electrical conversion which receive the optical signals, of wavelengths $\lambda 1$ and $\lambda 2$, separated by the means of demultiplexing DM, and converting these said means into electrical form.

Moreover, the multiplexing means MX communicates with the processing means G, notably in order to transmit to these said processing means the electrical signals multiplexed by the said means MX.

The surveillance system in conformity with the invention, shown in diagram form in FIG. 5, comprises:
superimposition means, and
two surveillance circuits CS1 and CS2 placed respectively in the nodes N1 and N2 of the network.

The superimposition means MS comprise two sinusoidal electrical oscillators of respective frequencies f1 and f2, which are marked respectively OS1 and OS2 and associated to the lasers LT1 and LT2 in the network head T.

Like the processing means G, these oscillators OS1 and OS2 modulate respectively the associated lasers LT1 and LT2 by low-frequency sinusoidal signals.

Moreover, the superimposition means MS comprise two sinusoidal electrical oscillators of respective frequencies f1 and f2, which are marked respectively OF1 and OF2 and associated to the lasers L1 and L2.

Like the multiplexer ME1 (or ME2), the oscillator OF1 (or OF2) modulates the associated laser L1 (or L2) by low-frequency sinusoidal signals f1 (or f2).

The frequencies f1 and f2 are both chosen below the transmission band associated to the information to be transmitted in the network.

For example, the wide band signals corresponding to this information are transmitted at a speed of 155 Mbits/sec (STM-1).

Each surveillance circuit CS1 or CS2 comprises successively:
an optical coupler C1 or C2 inserted in the fiber F1 or F2, in the corresponding node N1 or N2, upstream of the corresponding OADM MO1 or MO2,
an opto-electrical converter COE1 or COE2 linked to the coupler C1 or C2,
a low-pass filter PB1 or PB2 linked to the converter COE1 or COE2,
an automatic gain control device CG1 or CG2 linked to the filter PB1 or PB2,
two frequency sensors, or tonality sensors, marked DF11, DF12 or DF21, DF22, which are mounted in parallel and both receive the output signal of the automatic gain control device CG1 or CG2, and a control logic circuit CL1 or CL2 whose two inputs are linked respectively to the outputs of the two sensors DF11, DF12 or DF21, DF22 and whose output is linked to the input interface I1 or I2 of the multiplexer ME1 or ME2.

Each coupler CI or C2 is designed to sample a tiny part of the global optical power reaching it through the fiber F1 (for example 5% of this power) with a view to the surveillance of the ring network.

Each surveillance circuit SC1 or SC2 supplies information which is inserted in the STM-1 frame and which is thus recovered at the network head and treated by the processing means G.

In conformity with the invention, the frequency overmodulation is detected in order to ascertain whether the tracers (f1, f2) are present or absent at the input of each station.

At the input of each node N1 or N2, to which the wavelength λ1 or λ2 is assigned, the coupler C1 or C2 is a coupler of type 5/95 which allows the passage of 95% of the optical signals reaching it through the intermediary of the fiber F1 towards the multiplexer MO1 or MO2, and which samples 5% of these signals in order to use them in the corresponding surveillance circuit.

The converter COE1 or COE2 is a photodiode which converts the optical signals (5%) from the coupler C1 or C2 into electrical signals.

After this converter, there is an electrical signal which is constituted by the useful part of the information (towards the high frequencies) as well as the signaling part reserved for surveillance (towards the low frequencies).

The low-pass filter PB1 or PB2, placed behind the converter COE1 or COE2, is designed to eliminate the entire high-frequency part of the signal, which is useless for network surveillance.

The automatic gain control device CG1 or CG2 receives the signals thus filtered and makes it possible to send them to the two associated tonality sensors DF11, DF12 or DF21, DF22 with a constant voltage level, whatever the level of power at the input of the automatic gain control device.

Each tonality sensor is an integrated circuit which is pre-tuned on one of the two frequencies f1 and f2 and which makes it possible to know if there is, or not, an electrical signal at this frequency, at its output.

Sensors DF11 and DF21 are both pre-tuned on the frequency f1 whereas the sensors DF12 and DF22 are both pre-tuned on the frequency f2.

Each of the sensors DF1i and DF2i, which is pre-tuned on the frequency fi, where the index i takes the value 1 or 2, supplies in output a voltage Vsi which is:

at low level (0 V) if a signal at the frequency fi is present at its input, or at high level (5 V) if there is not a signal at this frequency fi at its input.

This information concerning the presence or absence of frequency is transferred, by means of the corresponding control logic circuit CL1 or CL2, in a byte which is transmitted in the overhead of the signal sent to the network head T.

The processing means G read the overhead bytes.

The information elaborated for the surveillance of the ring network is thus centralized and allows the network to be supervised.

In the example of FIG. 5, 4 bit sequences V1, V2, V3 and V4 are obtained and are used as byte bits FI of the of the RSOH discussed earlier.

More specifically, at the node N1, two items of voltage information are inserted in a byte F1, marked F1-1, and this information constitutes two bits B11 and B12 of F1-1.

Similarly, at the node N2, two items of voltage information are inserted in a byte F1, marked F1-2, and this information constitutes two bits B21 and B22 of F1-2.

The processing means G make it possible to visualize the information overheads received by these means G, and in particular the bytes F1.

Thus, the items of information V1, V2, V3 and V4, that is to say the voltages Vs1 and Vs2 for each of the nodes N1 and N2, are given exactly.

Table II below represents an example of an alarm truth table for a ring network of the type shown in FIG. 5.

TABLE II

| | NODE N1 | | NODE N2 | | NETWORK HEAD | | | |
|---|---|---|---|---|---|---|---|---|
| | F1-1 | | F1-2 | | F1-1 | | F1-2 | |
| | B11 | B12 | B21 | B22 | B11 | B12 | B21 | B22 |
| Rupture SF1 | 1 | 1 | 0 | 1 | 1 | 1 | 0 | 1 |
| Rupture SF2 | 0 | 0 | 1 | 1 | Lost | | 1 | 1 |
| Rupture SF3 | 0 | 0 | 0 | 0 | Lost | | Lost | |
| Insertion fault MO1 | 0 | 0 | 1 | 0 | Lost | 1 | 0 | |
| Insertion fault MO2 | 0 | 0 | 0 | 0 | 0 | 0 | Lost | |
| Fault LT1 | 1 | 0 | 0 | 0 | 1 | 0 | 0 | 0 |
| Fault LT2 | 0 | 1 | 0 | 1 | 0 | 1 | 0 | 1 |

Figure 6:
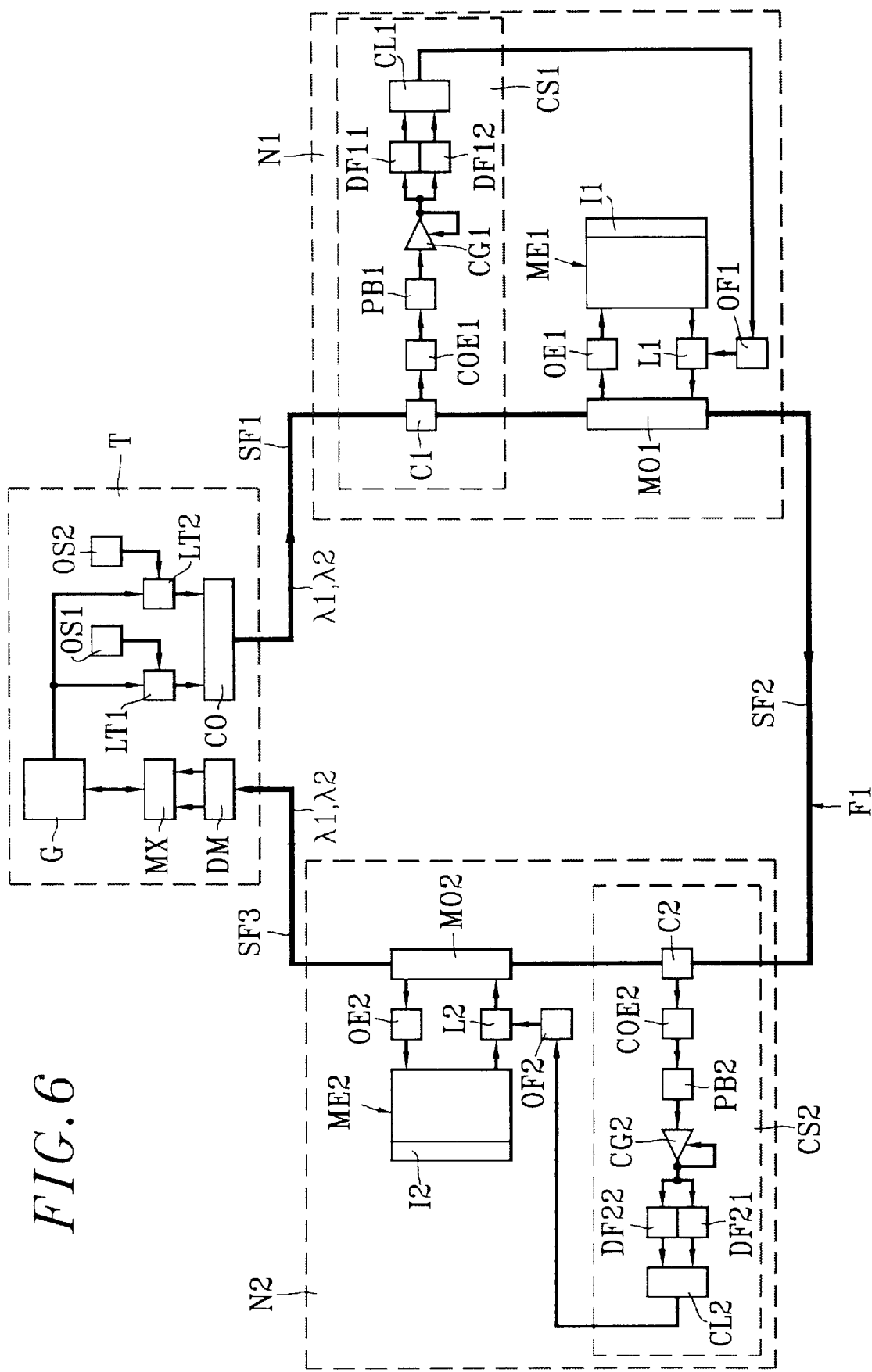
FIG. 6 is a diagram view of a second particular embodiment of the surveillance system concerned by the invention, also applied to the surveillance of a two-node unidirectional ring network.

The surveillance system in conformity with the invention, presented in diagram form in FIG. 6, also applies to the network shown in FIG. 5, differing from the system in conformity with the invention of FIG. 5 only in that, in the case of FIG. 6, the output of each control logic circuit CL1 or CL2 is linked, not to the input interface I1 or I2 of the multiplexer ME1 or ME2, but to the sinusoidal oscillator OF1 or OF2 in such a way as to modulate the carrier wave of frequency f1 or f2.

In this case, for the surveillance of the network, the low-speed transmission channel is used, which said channel is associated, by overmodulation, with the wide band signal injected in the network.

It should also be noted that, in the case of FIG. 6, the photodetection means (not shown in the figure) placed at the input of the electrical multiplexing means MX of the network head T are followed by a band-pass filter (not shown in the figure) which samples the low-speed channels.

These channels are then analyzed by the processing means G.

Figure 7:
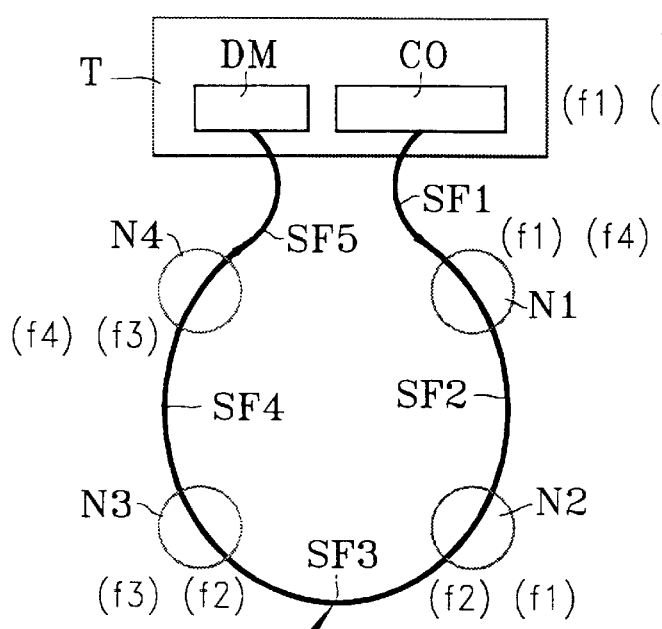
FIG. 7 illustrates in diagram form the application of the invention to the surveillance of a four-node unidirectional ring network.

FIG. 7 illustrates very schematically the surveillance of a unidirectional ring network with four nodes N1, N2, N3 and N4, in conformity with the invention.

The network shown in FIG. 7 comprises a fiber F1 which travels from and to the network head T, passing successively by the nodes N1 to N4.

In this case, there are five fiber sections, marked respectively SF1, SF2, SF3, SF4 and SF5.

The section SF1 lies between the network head T and the node N1, the section SF2 between the nodes N1 and N2, the section SF3 between the nodes N2 and N3, the section SF4 between the nodes N3 and N4 and the section SF5 between the node N4 and the network head.

Wavelengths λ1, λ2, λ3 and λ4 are assigned respectively to the nodes N1, N2, N3 and N4.

In the network head T, only the optical coupler CO connected to an extremity of the fiber F1 and the optical demultiplexing means DM connected to the other extremity of the fiber F1 have been shown.

In the case of FIG. 7, four electrical frequencies, situated outside the transmission band and marked respectively f1, f2, f3 and f4, are used.

In the network head T, two sinusoidal electrical oscillators (not shown in the figure), respectively of frequencies f1 and f4, are used.

In the node N1, two sinusoidal electrical oscillators (not shown in the figure), respectively of frequencies f1 and f4, are used.

In the node N2, two sinusoidal electrical oscillators (not shown in the figure), respectively of frequencies f2 and f1, are used.

In the node N3, two sinusoidal electrical oscillators (not shown in the figure), respectively of frequencies f3 and f2, are used.

In the node N4, two sinusoidal electrical oscillators (not shown in the figure), respectively of frequencies f4 and f3, are used.

The information to be transmitted by a ring network, for example of the type shown in FIG. 5, may in certain cases be lost, notably when the fiber F1 is cut.

This disadvantage may be remedied by the simultaneous transmission of the information on two optical fibers, namely the fiber F1 (constituting the normal fiber) and another fiber (constituting a back-up fiber).

Figure 8:
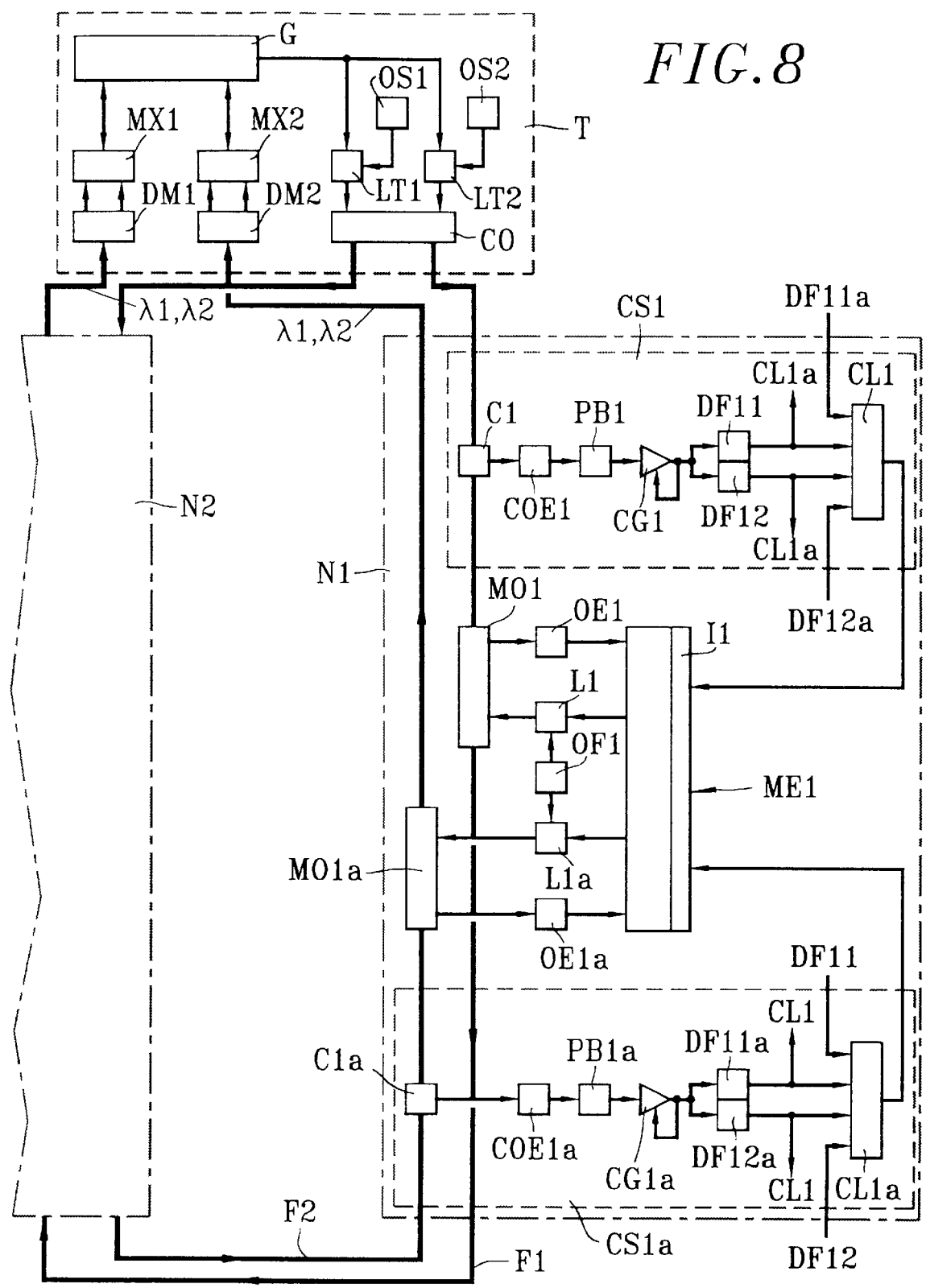
FIG. 8 illustrates in diagram form the application of the invention to the surveillance of a bi-directional ring network.
Figure 1:
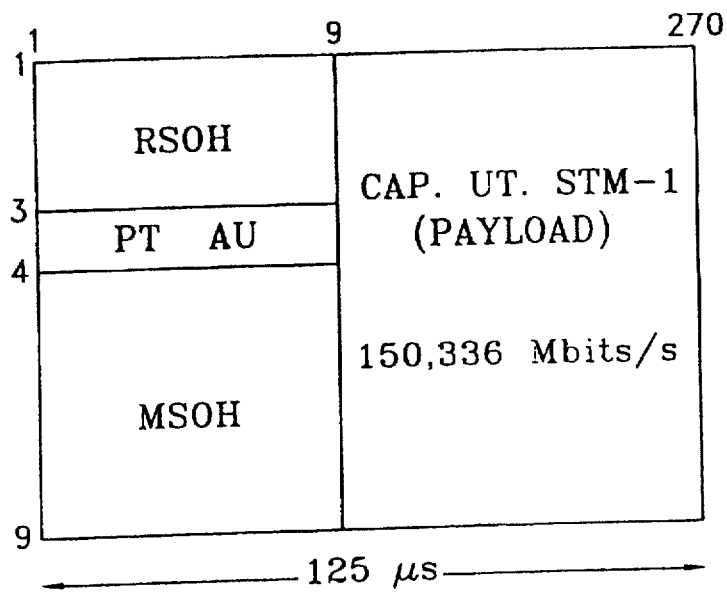
Figure 2:
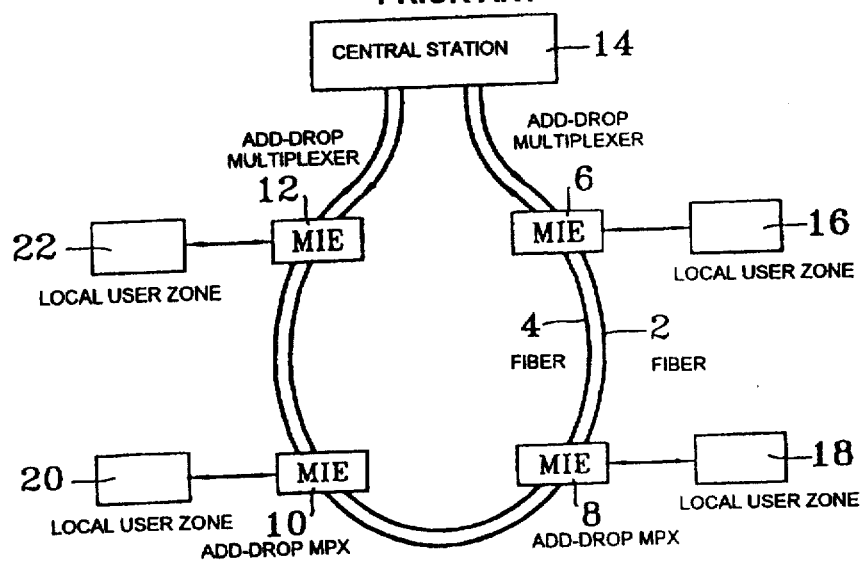
Figure 3:
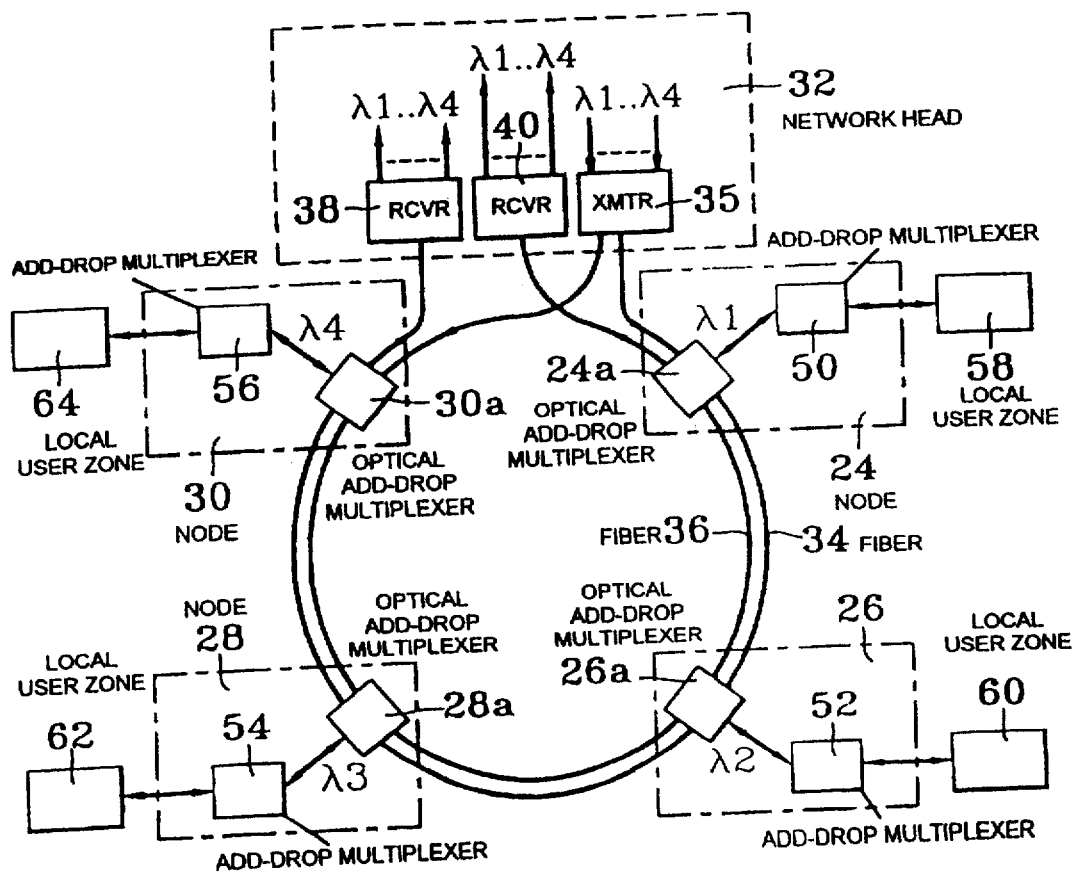
Figure 4:
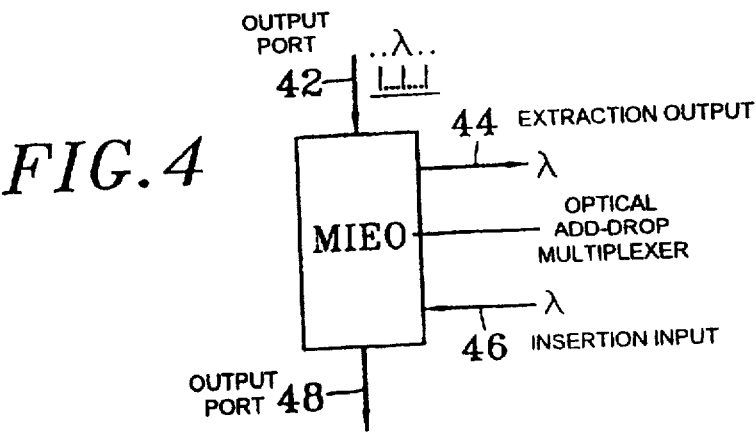
Figure 5:
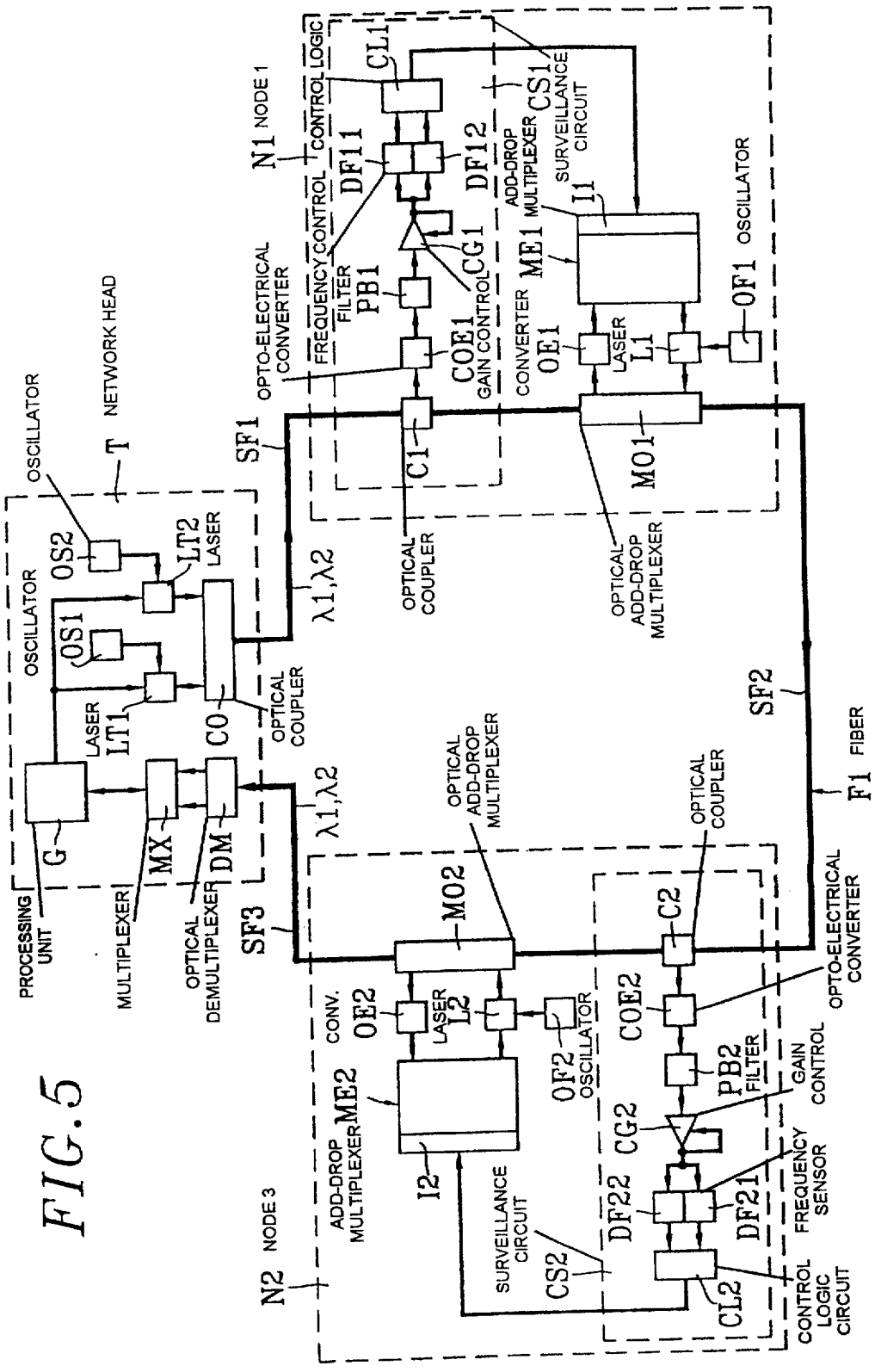
Figure 6:
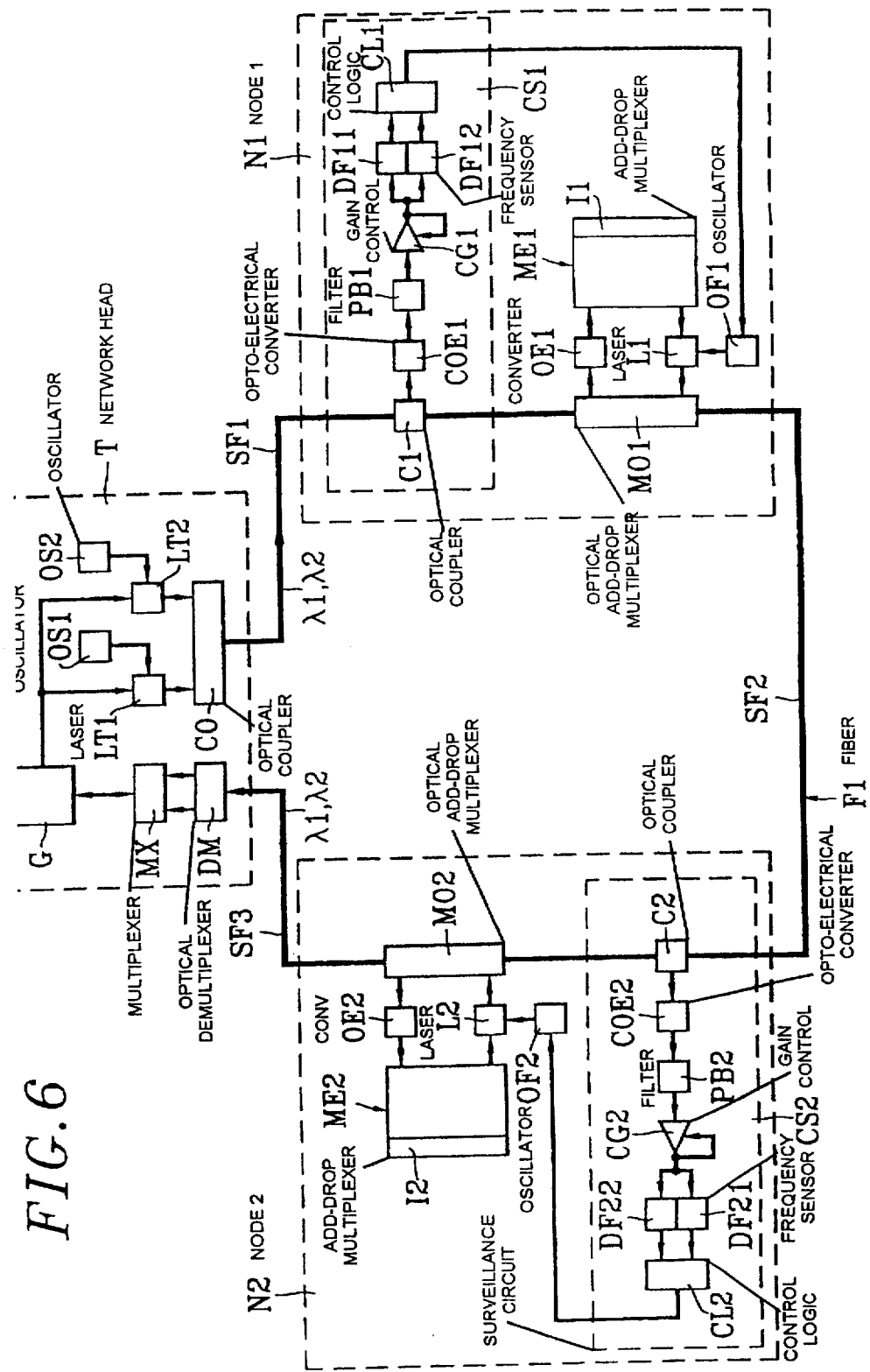
Figure 7:
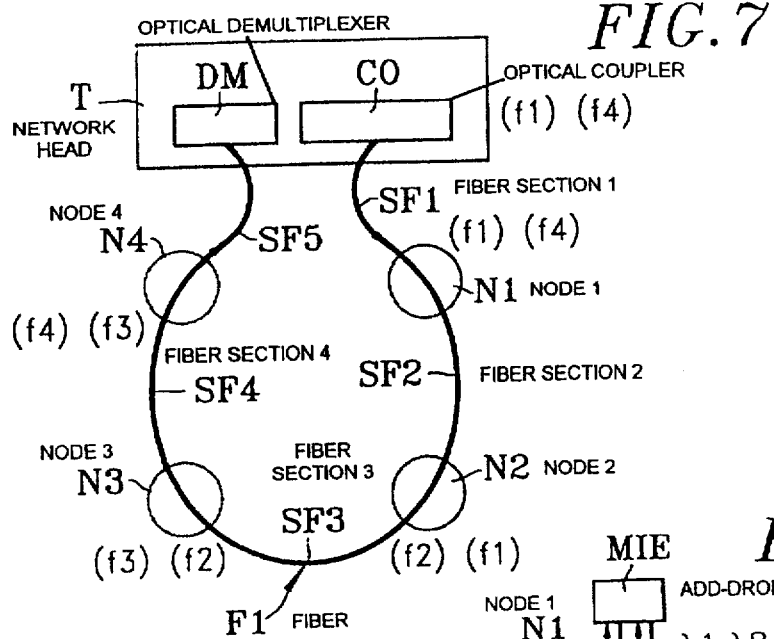
Figure 9:
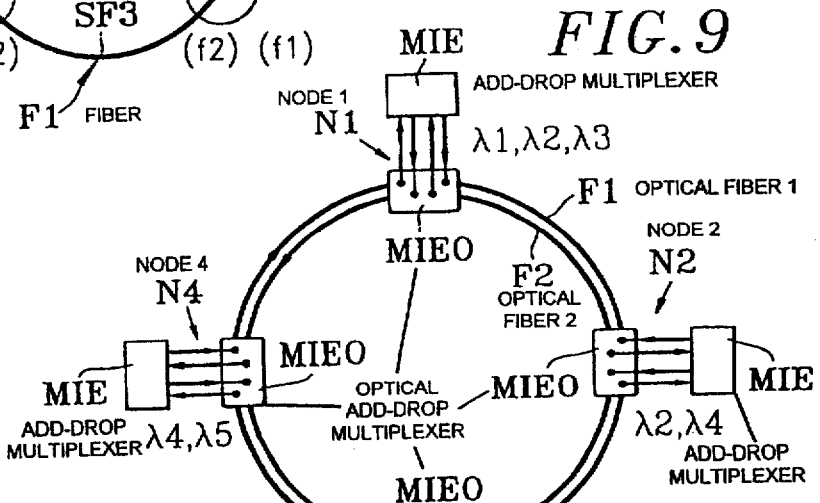
Figure 10:
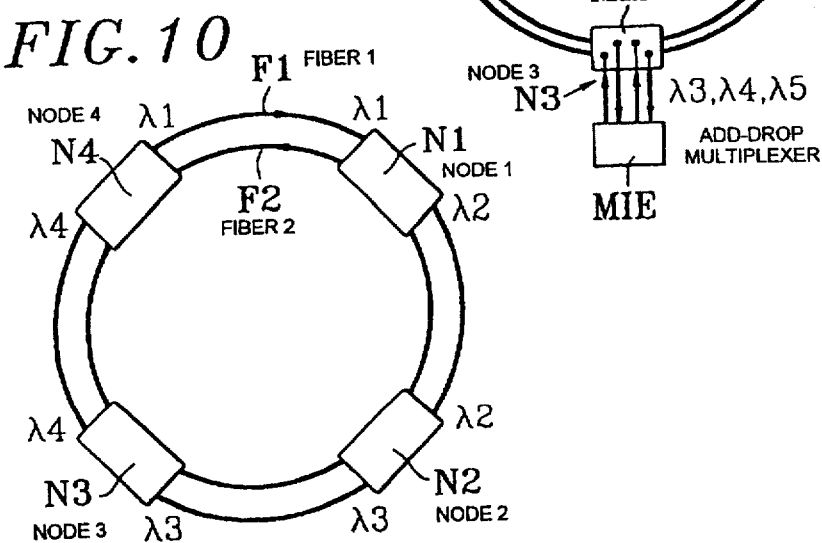
Figure 8:
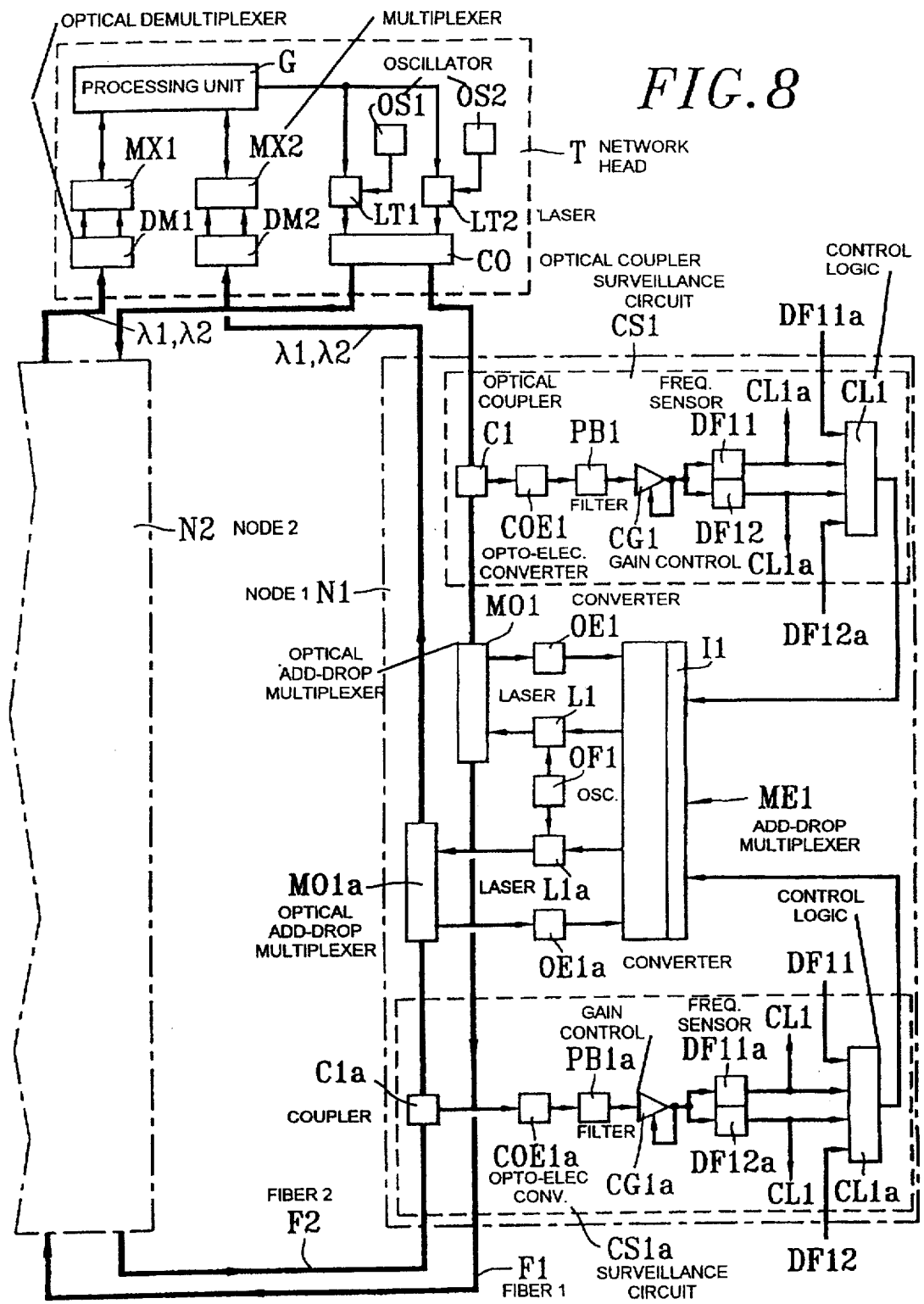

This is schematically illustrated in FIG. 8 which shows a bi-directional ring network with two nodes N1 and N2.

This is a modification of the network shown in FIG. 5.

FIG. 8 shows the network head T and the two nodes N1 and N2, to which are respectively assigned the wavelengths λ1 and λ2, as well as the optical fiber F1 and an additional optical fiber F2 (back-up fiber).

The information travels along the fibers F1 and F2 in opposite directions.

As may be seen from FIG. 8, most of the components comprised in each of the nodes N1 and N2 are two in number, one having the same reference as in FIG. 5 and the other bearing the same reference followed by the letter "a".

For example, in the case of FIG. 8, the node N1 comprises a double surveillance circuit consisting of the elementary circuit CS1 and of another elementary circuit CS1a constituted in the same way as the circuit CS1.

The node N1 also comprises a double OADM consisting of an elementary multiplexer MO1 associated with the fiber F1 and of another OADM, identical to the multiplexer MO1, but associated with the fiber F2 and marked MO1a.

The information is again sampled on the fiber F1 by the coupler C1, and an additional coupler C1a, placed upstream of the multiplexer MO1a, allows sampling of the information on the fiber F2 for the corresponding surveillance circuit CS1a.

The oscillator OF1 modulates the two lasers L1 and L1a.

The structure of the node N2 (shown only in outline form in FIG. 8) is comparable to the structure of the node N1.

In the network head T of the network shown in FIG. 8, the coupler CO is connected to the two optical fibers F1 and F2.

The demultiplexer DM shown in FIG. 5 is, in the case of FIG. 8, replaced by two demultiplexers, of the type of the demultiplexer DM, which are marked DM1 and DM2 and connected respectively to the fibers F1 and F2.

Similarly, the electrical multiplexer MX shown in FIG. 5 is, in the case of FIG. 8, replaced by two electrical multiplexers, of the type of the multiplexer MX2, which are marked MX1 and MX, are linked respectively to the demultiplexers DM1 and DM2 and both communicate with the processing means G.

In the case of FIG. 8, in the node N1, the signals from the two frequency sensors DF11 and DF12 are sent not only to the circuit CL1 but also to the circuit CL1a forming part of the elementary surveillance circuit CS1a associated to the fiber F2.

Moreover, the signals from the two frequency sensors DF11 and DF12 of the elementary circuit are sent not only to the associated control logic circuit CL1a but also to the control logic circuit CL1 of the elementary surveillance circuit CS1.

Such connections are also carried out in the node N2.

In these conditions, for each node and for each fiber, 4-bit sequences are inserted in a byte F1 of the RSOH, and the wide band signal now incorporating this byte is sent in the fibers.

For example, in the node N1, sequences of the type B11, B12, B13, B14 are sent in the fibers F1 and F2.

The bits B11, B12 come from the frequency sensors of the circuit CS1 and the bits B13, B14 come from the frequency sensors of the circuit CS1a.

Figure 9:
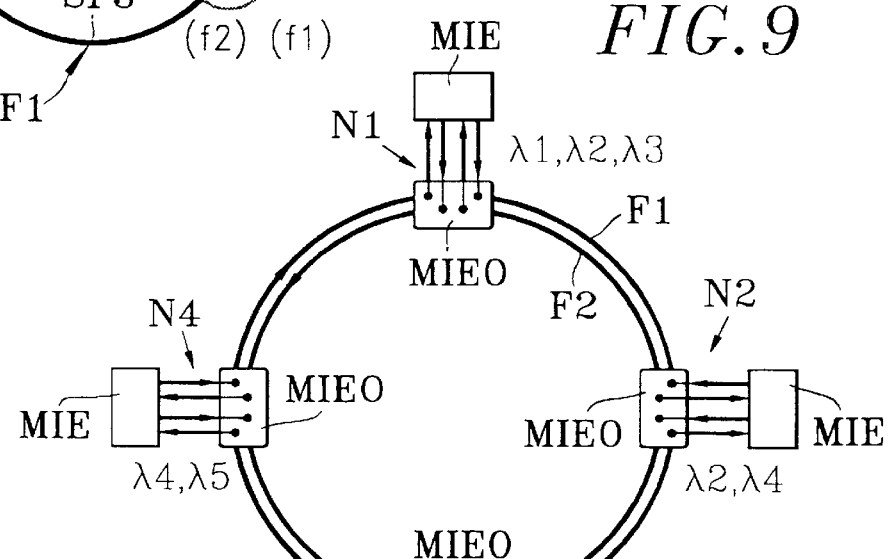
FIG. 9 illustrates in diagram form the application of the invention to the surveillance of a colored-node ring network.

A surveillance system in conformity with the invention may also be devised, adapted to a colored-node bi-directional ring network such as the one illustrated in FIG. 9.

The network shown in diagram form in FIG. 9 comprises four nodes N1, N2, N3 and N4 linked by two optical fibers F1 and F2 along which information circulating in the network in optical form travels in opposite directions.

Five optical wavelengths λ1, λ2, λ3, λ4 and λ5 are used in this network.

Each of the nodes comprises an OADM for inserting in the two fibers the information reaching it from an ADM also comprised in this node, and for extracting from these fibers information intended for this node which is then sent to the ADM.

As is shown in diagram form in FIG. 9, several optical wavelengths may be treated in each node.

Thus, the wavelengths λ1, λ2 and λ3 are treated in the node N1, the wavelengths λ2 and λ4 are treated in the node N2, the wavelengths λ3, λ4 and λ5 are treated in the node N3 and the wavelengths λ1 and λ5 are treated in the node N4.

For example, the nodes N1 and N4 communicate with each other by means of the wavelength λ1 and the nodes N1 and N3 communicate with each other by means of the wavelength λ3.

Those skilled in the art are capable of adapting the previously described examples of the invention to such a colored-node network.

In certain very long links an optical amplification may be used at the nodes of a ring network.

If the optical amplifier is used at a single wavelength, it is possible to devise a surveillance system in conformity with the invention in which the said optical amplifier is supervised as an optical emitter.

If the optical amplifier amplifies simultaneously several wavelengths at emission or reception, an additional surveillance point is provided in a surveillance system in conformity with the invention in order to elaborate additional surveillance signals in relation to this optical amplifier.

In a surveillance system conforming to the invention, it is possible to elaborate, at each surveillance point, from the sampling of the frequential tracer, signals functional of the measurement of the electrical power of the tracer, which allows a recognition of the wavelength, a measurement of the level revealing the degradation of the signal.

A comparison with the noise level of the useful band of the tracer allows elaboration of the signal/noise ratio and provides information on the evolution of the signal/noise ratio of the wide band signal, in relation to the "useful" information.

In this case, a characterization is necessary in order to ensure a correlation between the narrow band signal (tracer) and the wide band signal.

Thus, a degradation observed on the tracer also indicates a degradation on the wide band signal.

A surveillance system conforming to the invention may also be devised, adapted to a colored-section bi-directional ring network which is described in the following document:

French patent application No. 9505834 of May 17, 1995, "Wavelength multiplexed information transmission ring network" ("Réseau en anneau de transmission d'informations multiplexées en longueur d'onde") , A. Sutter, A. Hamel and L. Blain (see also EP-A-0743772).

The above-mentioned document is incorporated with this application for reference purposes.

Figure 10:
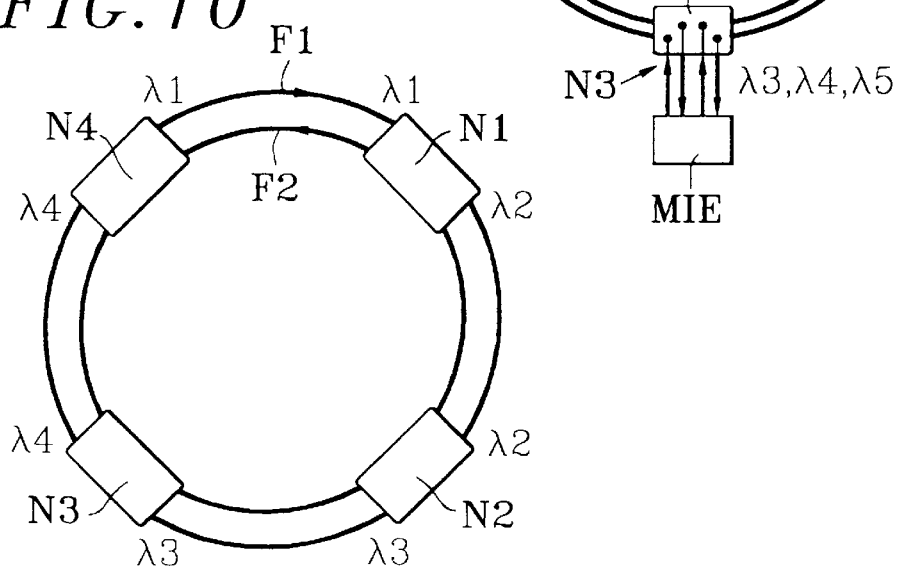
FIG. 10 illustrates in diagram form the application of the invention to the surveillance of a colored-section ring network.

FIG. 10 illustrates in diagram form an example of such a colored-section ring network.

The network shown in FIG. 10 comprises four nodes N1, N2, N3 and N4 and two optical fibers F1 and F2 along which the information to be transmitted in this bi-directional network travels in opposite directions.

As may be seen from FIG. 10, a wavelength is assigned to each section lying between two nodes of the network and four wavelengths $\lambda 1$, $\lambda 2$, $\lambda 3$ and $\lambda 4$ are used.

For example, the wavelength $\lambda 2$ is assigned to the section between the nodes N1 and N2.

The traffic exchanged between the node N1 and the node N2 takes this wavelength $\lambda 2$ on the short arc (fiber F1) and the long arc (fiber F2 used for the protection of the network).

For the application of this invention, a surveillance is provided for all the wavelengths $\lambda 1$ to $\lambda 4$.

The specialist is capable of adapting the previously described examples of the invention to such a colored-section network.

With a colored-section network, attention is drawn to the importance of:

fitting the ADMs with additional line cards and using processing means in the Multiplexing Section Protection (MSP) version, "coloring" the emission cards by assigning a wavelength per section to be protected, constructing an "optical layer" (based on ADM multiplexers) capable of interconnecting the different interfaces of the network ADMs adequately.

In one of the nodes N1 to N4 shown in FIG. 10, constituting the central node, or head, of the network, the information gathered makes it possible to elaborate the surveillance of the optical layer and any alarms are sent to the processing means of the network.

These said processing means supervise the transmission of the information according to the SDH standard.

This invention may be used with other transmission standards such as, for example, the American SONET standard which resembles the SDH standard.

We claim:

1. Surveillance system of a multi-wavelength ring network intended for the transmission of information in optical form and which are wavelength multiplexed, said information when converted into electrical form occupy a frequency band known as transmission band, said network comprising:

nodes (N1, N2; N1 to N4) optically linked to each other by at least one first optical fiber (F1, F2) which passes successively by these nodes and along which the information is intended to travel in a first direction, add-drop multiplexers, (MO1, MO1a, MO2), known as ADMs, respectively placed in the nodes of the network and capable of sending information to the other nodes, optical add-drop multiplexers (ME1, ME2), known as OADMs, respectively associated with the AMDs, each OADM being capable of inserting, in the first fiber, information coming from the associated ADM and of extracting from this first fiber information for this associated ADM, and network processing means (G), at least one wavelength being treated in each node, this surveillance system being characterized in that it comprises:

means (OF1, OF2, OS1, OS2) of superimposing on the information, for at least one wavelength per node, an optical surveillance signal whose frequency, when this signal is converted into electrical form, is outside the transmission band, in each node, a surveillance circuit (CS1, CS1a, CS2) for sampling at least one part of the surveillance signals reaching this node, elaborating surveillance information in function of this sampled part and sending this surveillance information to the first optical fiber via the ADM and the OADM of this node, this surveillance information reaching in this way the processing means.

2. System according to claim 1, characterized in that the information is transmitted according to the Synchronous Digital Hierarchy transmission standard.

3. System according to claim 2, characterized in that the surveillance information is sent to the processing means (G) after being introduced in the overhead of the information to be transmitted optically.

4. System according to claim 1, characterized in that each ADM comprises a means of emitting light (L1, L1a, L2) which is optically coupled to the corresponding OADM and which is controlled by electrical signals corresponding to the information to be transmitted optically and by an electrical signal whose frequency is situated outside the transmission band, this electrical signal being modulated by electrical signals corresponding to the surveillance information.

5. System according to claim 1, characterized in that the network comprises a second optical fiber (F2) passing successively by the nodes of the network and along which information is intended to travel in a second direction opposite to the first direction, each OADM being capable of inserting information coming from the associated ADM in the second fiber, and of extracting from this second fiber information intended for the associated ADM and in that the surveillance information sent in this first fiber (F1) is also sent in the second fiber (F2) and vice versa.

6. System according to claim 1, characterized in that each node (N1, N2) is associated with a wavelength.

7. System according to claim 5, characterized in that the network is a colored-node network, each node being capable of treating a plurality of wavelengths.

8. System according to claim 5, characterized in that the network is a colored-section network, each node being capable of treating two wavelengths.

9. System according to claim 1, characterized in that the frequency of each optical surveillance signal converted into electrical form is below the transmission band.

* * * * *

UNITED STATES PATENT AND TRADEMARK OFFICE
CERTIFICATE OF CORRECTION

PATENT NO.    : 5,943,148
DATED         : August 24, 1999
INVENTOR(S)   : Hamel et al.

Page 1 of 7

Figure 2:
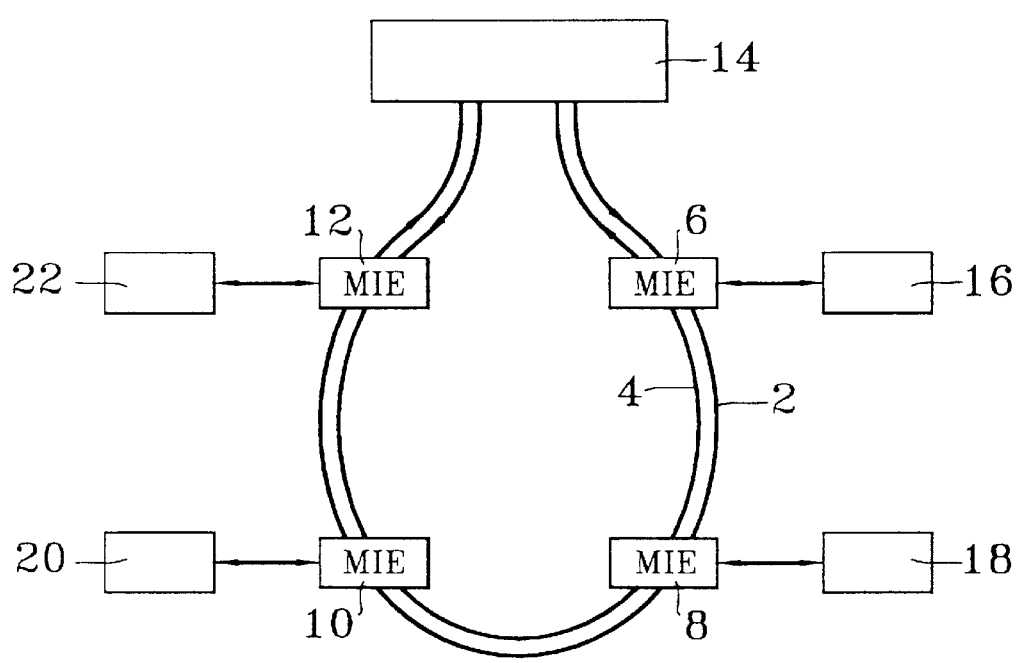
Figure 3:
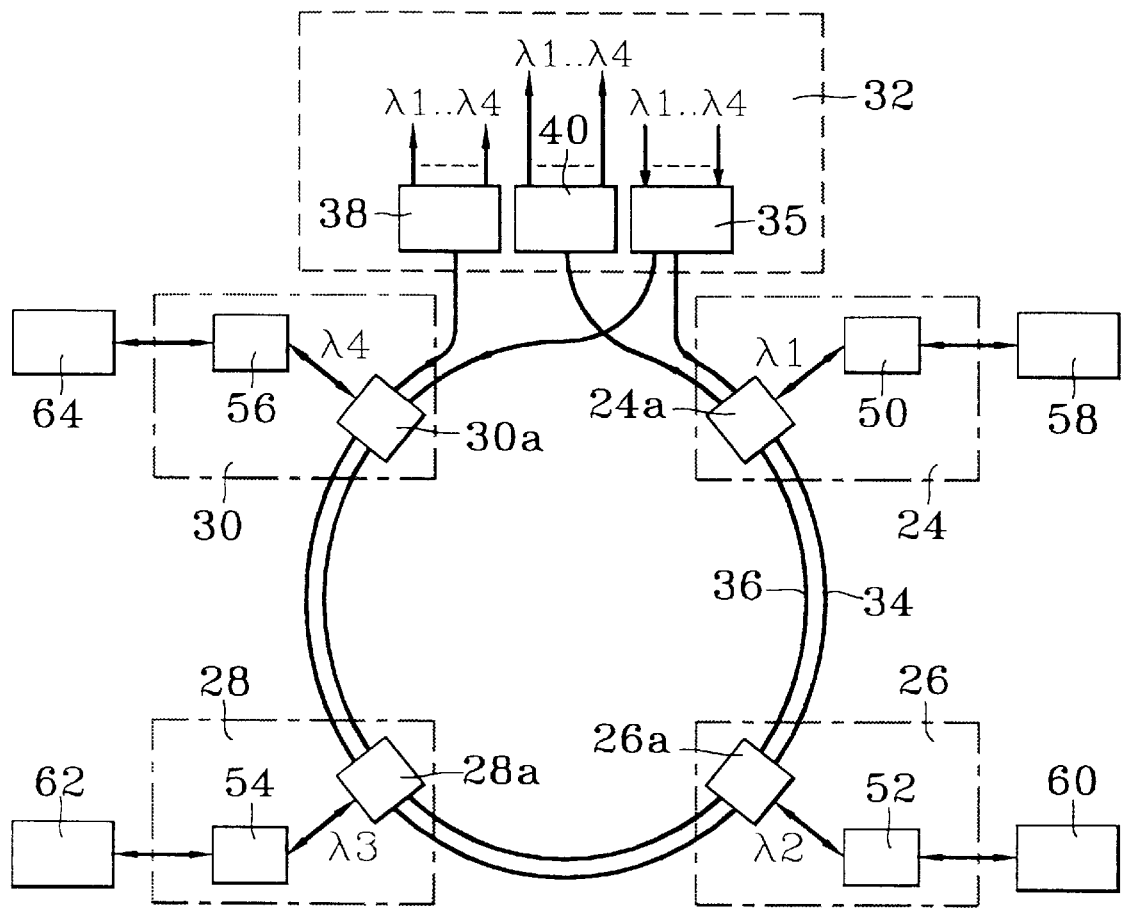
Figure 4:
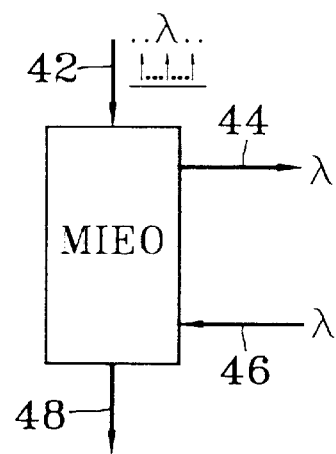

It is certified that error appears in the above-identified patent and that said Letters Patent is hereby corrected as shown below:

Drawing should be corrected as per attached 6 (six) sheets of drawings, FIG. 2 and FIG. 3 should be labelled -- Prior Art --, and the descriptions are missing from FIGS. 2-10.

Signed and Sealed this

Twenty-first Day of August, 2001

*Attest:*

*Attesting Officer*

NICHOLAS P. GODICI
*Acting Director of the United States Patent and Trademark Office*